(No Model.)
A. F. BOARDMAN.
FISHING REEL.
No. 467,714. Patented Jan. 26, 1892.
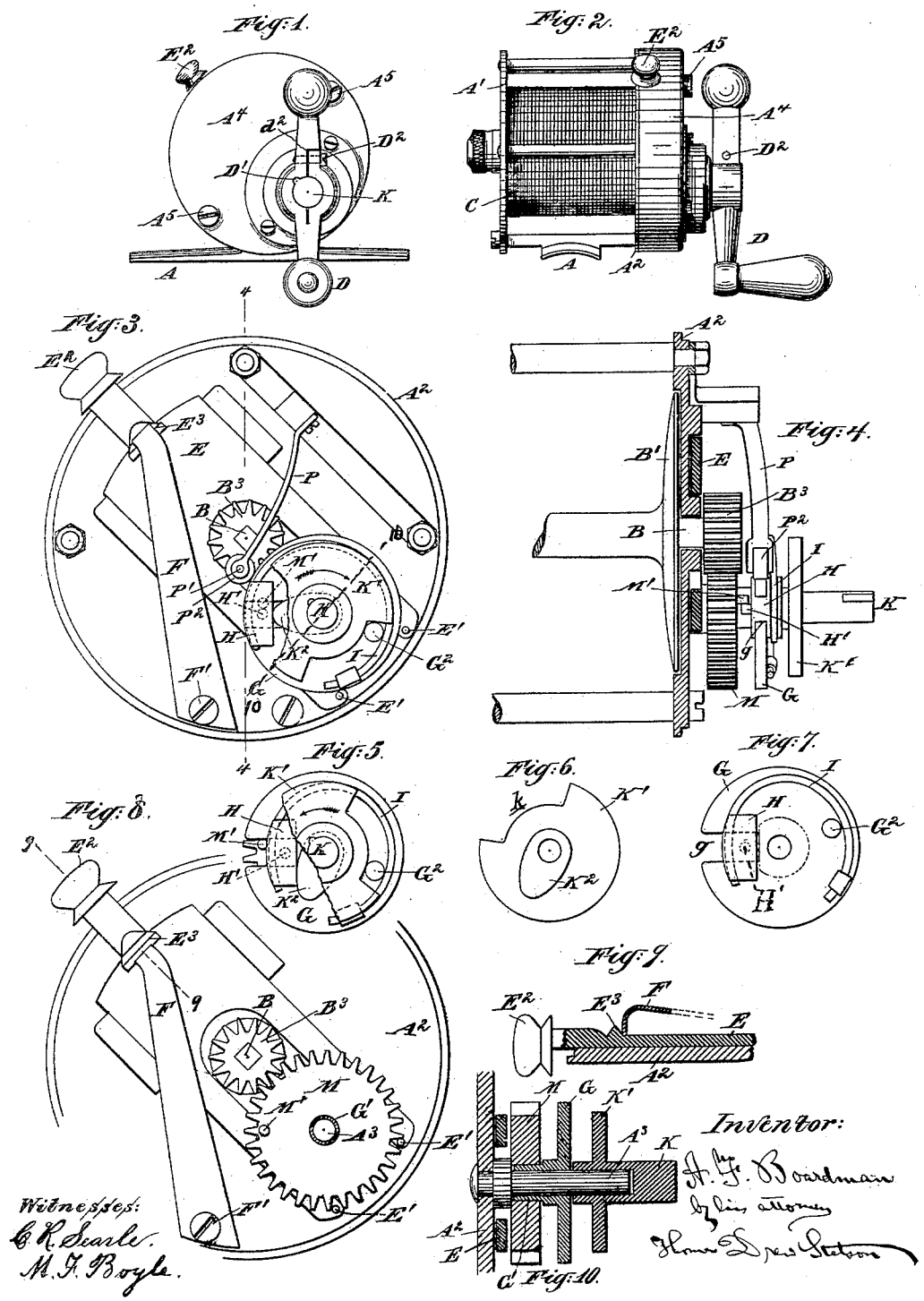

UNITED STATES PATENT OFFICE.

ALPHONSO F. BOARDMAN, OF BROOKLYN, NEW YORK.

FISHING-REEL.

SPECIFICATION forming part of Letters Patent No. 467,714, dated January 26, 1892.

Application filed October 8, 1891. Serial No. 408,080. (No model.)

*To all whom it may concern:*

Be it known that I, ALPHONSO F. BOARDMAN, a citizen of the United States, residing in Brooklyn, Kings county, in the State of New York, have invented a certain new and useful Improvement in Fishing-Reels, of which the following is a specification.

I provide for locking the spool in an immovable position or liberating it at will and also for detaching and reattaching the spool and crank at will. The change is effected to lock in a fixed position and again unlock by pressing a knob inward or outward. It is effected for conditioning the spool to wind up the line or to let it run out by turning the crank a small part of a revolution in one direction or the other. Turning it one way engages the crank firmly and strongly with the spool by suitable intermediate connections. Turning it the other way disconnects these parts. To rigidly lock the spool in a fixed position, one or more dogs are carried on a sliding plate, which latter is operated by the knob and has a yielding catch to hold it with gentle force either in the position to engage or release the plate. The plate may be moved in either direction by applying sufficient force to the knob. When the spool is set free from this rigid locking, it may be controlled by the crank or not, as preferred. The engagement is effected by means of a pin which is capable of being traversed outward and inward in a radial slot in a plate or flange carried on the crank-shaft. When this pin is out or away from the center to its farthest extent, it engages with a pin permanently set in a corresponding plate on the shaft of the spool. When it is moved inward, either pin can move past the other pin without contact. In the latter condition the fish may run out with the line to any required extent, restrained only by the friction of the finger or other friction applied to the spool. When the crank is turned in the direction to take in the line, the fact of turning it in that direction causes the pin to be moved outward where it will engage.

The accompanying drawings form a part of this specification and represent what I consider the best means of carrying out the invention.

Figure 1 is a side view. Fig. 2 is an elevation at right angles to Fig. 1. The remaining figures are on a larger scale. Fig. 3 is a face view, certain portions being removed. Fig. 4 is a section on the line 4 4 in Fig. 3. Figs. 5, 6, and 7 are face views of portions detached. Fig. 8 is a view corresponding to Fig. 3, but showing the parts differently conditioned and with more parts omitted. Fig. 9 is a section on the line 9 9 in Fig. 8. Fig. 10 is a section through certain parts on the line 10 10 in Fig. 3.

Similar letters of reference indicate corresponding parts in all the figures where they appear.

A is the base or foundation plate, properly formed to match the cylindrical form of the fishing-pole, (not shown,) and A' A$^2$ are circular side plates rigidly fixed to the base A and forming bearings for the shaft B and the circular disks B' B$^2$, fixed thereon, which together constitute the spool.

C is the line, which is wound on the spool by revolving the latter in one direction by acting on the crank D in the ordinary manner.

On one overhung end of the shaft B is fixed a spur gear-wheel B$^3$. Engaged with this and turning loosely on a sleeve G' is a larger gear-wheel M, which performs important functions.

It is sometimes desirable to lock the spool in a fixed position, and for this purpose I have devised the following means: On the outer face of the fixed disk A$^2$ is mounted a sliding plate E, which is forked to extend beyond the shaft B and pin A$^3$. It lies between the wheel M and the fixed plate A$^2$ and carries two pins E' E', arranged to lock with the teeth of the wheel M when the slide is moved to its extreme position in one direction and to be moved out of engagement and leave the wheel free, except, as described farther on, when the slide is moved to its extreme position in the other direction.

E$^2$ is a knob at one end of the slide E, by which the position of the slide may be controlled.

F is a flat spring secured on the plate A$^2$ by a screw F' and pressing by its bent end upon the outer face of the slide E. This face is formed with a ridge E$^3$, of V-section, which ridge is moved outward and inward under the correspondingly-V-shaped end of the spring as it is adjusted outward and inward. The pressure of the spring on the ridge holds it in the outward position when it is set there, and thus holds the pins E' engaged with the teeth of the wheel M. In this condition of the parts the spool is locked. When it is desired to unlock it, the operator presses on the knob $E^2$ with sufficient force to move the slide, notwithstanding the pressure of the spring F on one side of its V-shaped ridge $E^3$, the force being sufficient to overcome the spring and deflect it outward enough to let the V-shaped ridge pass under it. This movement having been accomplished, the spring snaps inward again, this time on the outer face of the ridge $E^3$, and holds the plate E firmly in its extreme inward position. In this position the pins E' are out of engagement with the wheel M, and the spool is unlocked ready to turn freely in either direction or to be controlled by the other means to be now described.

On the outer face of the wheel M is a pin M'. The sleeve G', on which this wheel M is loosely centered, is itself supported on a pin $A^3$, firmly set in the plate $A^2$. On the sleeve G' is fixed a wheel or disk G, having a radial slot $g$, in which is mounted a block H, free to be traversed radially in the slot subject to the force of a spring I, carried on the disk G. The inner face of the block H carries a pin H'. When the block H is moved inward by the force of the spring I, its pin H' is so near the axis of motion that it is out of the path of the pin M' and the latter may revolve freely without being interfered with; but when the block H is moved outward in its slotted guide, so that its outer surface coincides with the periphery of the disk G, the pin H' is in the path of the pin M' and prevents its revolving. When the disk G and its attachments are revolved by the crank D, as will presently appear, the pin H', acting against the pin M', revolves the shaft B and winds in the line C. The crank D transmits the force through the medium of a movable part, which I will call a "cam-piece" K, certain portions being designated, when necessary, by supernumerals K' $K^2$. This cam-piece K is mounted loosely on the pin $A^3$ and is composed of a suitable outer end, a partial disk K' on its mid-length, and a cam $K^2$ on its inner end. This piece is held in position and all the parts are protected by the outer plate $A^4$, confined by screws $A^5$.

$G^2$ is a stout pin projecting from the outer face of the disk G. The wide notch in the partial disk K' receives the pin $G^2$ and acts on it to turn the wheel G in one direction or the other, but with a little liberty for movement of the crank between the respective actions. When the crank D, and consequently the piece K, is turned in the direction to accumulate the line C upon the spool, the cam $K^2$ acts under or against the inner face of the block H and forces it outward, thus bringing the pin H' to strike the pin M' and communicate the motion to the wheel M, and consequently to the spool. When, on the contrary, the crank is turned in the direction to unwind the reel, there is a slight resistance holding the other parts, and the piece K partially revolves relatively to the wheel G, making the cam $K^2$ move out of engagement with the block H, and allows the latter to be drawn inward by the force of the spring I. This movement carries the pin H' out of the path of the pin M', and the spool is entirely free.

The turning of the cam-piece K relatively to the wheel G is limited by the width of the notch or aperture $k$ in the partial wheel K'. This notch receives the pin $G^2$, which is set in the wheel G, and as soon as it has performed a small fraction—say about one-quarter of a revolution—the side of the notch strikes the pin $G^2$. It is thus limited in its motion in either direction.

To insure the re-engagement of the pins H' and M', I provide additional frictional resistance on the periphery of the wheel G by a spring P, mounted on a fixed plate $A^2$ and carrying a pin P' and small roller $P^2$. This induces a tendency of the wheel G to "hang back" when the crank is turned. This hanging back of the wheel G is sufficient to overcome the slight friction between the parts and insures the forcing out of the block H by the cam $K^2$ and brings the pin H' into engagement with the pin M' on the spur-wheel M.

Under some conditions when the block H is not forced out the roller $P^2$ may drop slightly into the outer end of the radial slot $g$. This makes still more resistance to the turning of the wheel G until the block H is moved outward far enough to force the roller $P^2$ outward and make the periphery of the wheel G practically smooth and continuous.

The crank D is equipped in the ordinary manner with a balance-weight on an arm extending in the opposite direction. It is retained on the end of the cam-piece K by means of a splined key D'. It is, furthermore, strongly clamped on the end of the cam-piece by being split, as indicated by $d^2$, the elasticity of the material being made available through a binding-pressure applied to the split part through the medium of a screw $D^2$. Whenever it is desired to remove the crank D from the cam-piece K, it is necessary simply to slacken the screw $D^2$ and pull the crank D off. The key D' may be kept separate or may remain attached either to the crank D or to the cam-piece K. To re-attach the crank, it is only necessary to apply it and turn it in the position to make the key-seats coincide, force it home, insert the key, if it is not already in place, and again tighten the screw $D^2$.

I claim as my invention—

1. In a fishing-reel, the two shafts or sleeves G' and K, supported in line with each other, connected one with the spool and the other with the crank, in combination with each other and with the wheel M, having the pin M' and carried on one sleeve, and the pin H', capable of being moved outward and inward, carried on the other shaft, all arranged for joint operation, substantially as herein specified.

2. In a fishing-reel, the two shafts or sleeves G' and K, supported in line with each other, connected one with the spool by intermediate mechanism and the other with the crank, in combination with each other and with the wheel M, pin M', and carried on one sleeve, and a movable pin H', capable of being moved outward and inward, carried on the other sleeve, and with the cam K², mounted on the crank-shaft, and provisions for operating it by turning the crank in one direction or the other, as herein specified.

3. In a fishing-reel having a crank capable of disconnection from the spool, the notched plate K' and cam K², carried by the crank-shaft, in combination with the wheel M, having pin M' and carried by an intermediate shaft, and a suitably-mounted pin H', arranged to be moved outward and inward radially as the cam is operated in the lost motion when the crank is turned in one direction or the other, substantially as herein specified.

4. In a fishing-reel having a crank capable of disconnection from the spool by shifting the position of the pin H', the cam K², mounted on the crank-shaft, with provisions for turning it a partial revolution in one direction and the other, the spring Q, and friction device P, mounted on the end plate and arranged to create resistance and allow the cams to act in combination with each other and with the pin H', movable radially, substantially as herein specified.

In testimony that I claim the invention above set forth I affix my signature in presence of two witnesses.

ALPHONSO F. BOARDMAN.

Witnesses:
CHARLES R. SEARLE,
M. F. BOYLE.